(12) United States Patent
Krajnc

(10) Patent No.: US 12,317,391 B2
(45) Date of Patent: May 27, 2025

(54) CONTROLLING A PIXELATED LIGHTING DEVICE BASED ON A RELATIVE LOCATION OF A FURTHER LIGHT SOURCE

(71) Applicant: SIGNIFY HOLDING B.V., Eindhoven (NL)

(72) Inventor: Hugo José Krajnc, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 43 days.

(21) Appl. No.: 18/010,835

(22) PCT Filed: Jun. 11, 2021

(86) PCT No.: PCT/EP2021/065780
§ 371 (c)(1),
(2) Date: Dec. 16, 2022

(87) PCT Pub. No.: WO2021/254901
PCT Pub. Date: Dec. 23, 2021

(65) Prior Publication Data
US 2023/0225035 A1 Jul. 13, 2023

(30) Foreign Application Priority Data
Jun. 19, 2020 (EP) .................................. 20181092

(51) Int. Cl.
*H05B 47/125* (2020.01)
*H05B 45/20* (2020.01)
(Continued)

(52) U.S. Cl.
CPC ......... *H05B 47/125* (2020.01); *H05B 47/155* (2020.01)

(58) Field of Classification Search
CPC ........ H05B 47/18; H05B 47/19; H05B 45/20; H05B 45/31; H05B 45/325; H05B 45/347; H05B 45/3725
See application file for complete search history.

(56) References Cited

U.S. PATENT DOCUMENTS

2005/0174473 A1* 8/2005 Morgan ............... H05B 45/355
348/370
2016/0366751 A1* 12/2016 Xu ........................ H05B 47/19
(Continued)

FOREIGN PATENT DOCUMENTS

WO 2016124390 A1 8/2016
WO 2017144408 A1 8/2017
(Continued)

*Primary Examiner* — Wei (Victor) Y Chan

(57) ABSTRACT

A system for controlling a pixelated lighting device (1) is configured to determine a location of a further light source (29) relative to the pixelated lighting device and obtain original light settings (91-99) for the pixelated lighting device. The pixelated lighting device comprises a plurality of individually addressable light segments (11-19) and the original light settings are associated with respective ones of the individually addressable light segments. The system is further configured to obtain a further original light setting (89) for the further light source, adjust the original light settings based on the further original light setting and the relative location of the further light source, and control the individually addressable light segments to emit light according to the adjusted original light settings.

13 Claims, 10 Drawing Sheets

(51) Int. Cl.
*H05B 47/155* (2020.01)
*H05B 47/18* (2020.01)
*H05B 47/19* (2020.01)

(56) References Cited

U.S. PATENT DOCUMENTS

| | | | |
|---|---|---|---|
| 2017/0061905 A1* | 3/2017 | Lin | ........................ H05B 45/60 |
| 2018/0352636 A1 | 12/2018 | Engelen et al. | |
| 2019/0132928 A1 | 5/2019 | Rodinger et al. | |
| 2019/0174603 A1 | 6/2019 | Green et al. | |
| 2020/0227006 A1* | 7/2020 | Yao | ........................ G09G 3/006 |

FOREIGN PATENT DOCUMENTS

| | | |
|---|---|---|
| WO | 2018046710 A1 | 3/2018 |
| WO | 2018224390 A1 | 12/2018 |
| WO | 2021209306 A1 | 10/2021 |

* cited by examiner

CONTROLLING A PIXELATED LIGHTING DEVICE BASED ON A RELATIVE LOCATION OF A FURTHER LIGHT SOURCE

CROSS-REFERENCE TO PRIOR APPLICATIONS

This application is the U.S. National Phase application under 35 U.S.C. § 371 of International Application No. PCT/EP2021/065780, filed on Jun. 11, 2021, which claims the benefit of European Patent Application No. 20181092.6, filed on Jun. 19, 2020. These applications are hereby incorporated by reference herein.

FIELD OF THE INVENTION

The invention relates to a system for controlling a pixelated lighting device, said pixelated lighting device comprising a plurality of individually addressable light segments.

The invention further relates to a method of controlling a pixelated lighting device, said pixelated lighting device comprising a plurality of individually addressable light segments.

The invention also relates to a computer program product enabling a computer system to perform such a method.

BACKGROUND OF THE INVENTION

With the introduction of LED technology, it has become possible to produce light strips to illuminate houses and offices. An advantage of light strips is that they can illuminate a large wide space relatively uniformly. Initially, all LEDs of a light strip were only able to emit one color, e.g. white. Later, certain light strips allowed a user to change the color emitted by the LEDs, but all LEDs within the strip still emitted the same color simultaneously. The next advance in light strips was the pixelated light strip. Pixelated light strips comprise multiple individually controllable segments, each such segment generally referred to as a 'pixel' of which e.g. the color and/or intensity of light emitted may be controlled. Each segment comprises one LED or multiple LEDs of the same or different colors.

With pixelated light strips, the user is able to create different ambiances without needing a different new product per color desired, but also make gradients that subtly change along the device (e.g. make a sunrise effect in a light strip attached to the ceiling where the center is brighter and yellower than the edges). Other pixelated lighting devices exist as well, such as luminaires with multiple light sources (e.g. Hue Beyond), where each source can act independently from each other, or luminaires that have both an upwards and a downwards facing light source.

Most effects currently designed for pixelated devices focus mainly on how that effect spreads across the product. For example, how gradients should be applied along a light strip to avoid sharp transitions which can affect the perceived ambiance. Although these make sense on an individual basis, the general ambiance can also be affected if there are other pixelated sources in the proximity. For example, if there is a light strip on a cove on the ceiling and a top/bottom wall light under it, they might not be necessarily aligned due to construction reasons. In other words, each device might be internally coherent when it comes to a light effect, but the space shared among them might show inconsistencies. Although the light effects individually are acceptable, the combination might not look correct.

When a single light effect is rendered using multiple (pixelated) lighting devices, such as disclosed in WO 2018/224390 A1, an incoherent light experience is normally not a problem. For example, in the system described in WO 2018/224390 A1, a blue light effect with a certain center position and a certain radius may be specified and in that case, lights located close to the center have a strong blue color whereas lights further away from the middle have a less strong blue color. However, lighting devices which are each requested to render own, independent light effects, i.e. light effects which do not form one larger intentionally coordinated light effect, e.g. light effects from independently created light scenes, are more common.

WO 2016124390A1 discloses a control unit for use in a lighting system. The control unit comprises: a localization module which detects when a portable lighting device is within a predetermined vicinity of a fixed light source; and a controller which selects between different roles for the portable light source, the roles comprising (i) an independent role where the light output of the fixed and portable light sources are controlled independently of one another, and one or both of (ii) a slave role where the light output of the portable light source is adjusted in dependence on that of the fixed light source, and/or (iii) a master role where the light output of the fixed light source is adjusted in dependence on that of the portable light source. The controller is configured to switch to one of the slave role or the master role in response to the detection of the predetermined vicinity. The role may be based on factors such as the position of the portable light source with respect to the one or more other light sources in the system, environmental conditions, and/or a user-defined role.

SUMMARY OF THE INVENTION

It is a first object of the invention to provide a system, which is able to help provide a coherent light experience involving multiple devices which render light effects simultaneously and which are requested to render own, independent light effects.

It is a second object of the invention to provide a method, which is able to help provide a coherent light experience involving multiple devices which render light effects simultaneously and which are requested to render own, independent light effects.

In a first aspect of the invention, a system for controlling a pixelated lighting device, said pixelated lighting device comprising a plurality of individually addressable light segments, comprises at least one control interface and at least one processor configured to determine a location of a further light source relative to said pixelated lighting device, obtain original light settings for said pixelated lighting device, said original light settings being associated with respective ones of said individually addressable light segments, obtain a further original light setting for said further light source, adjust said original light settings based on said further original light setting and said relative location of said further light source, and control, via said at least one control interface, said individually addressable light segments to emit light according to said adjusted original light settings.

Thus, the system may determine whether there is a further light source (pixelated or not) close to the pixelated lighting device (e.g. light strip), sufficiently so that the effects they create might interact/affect each other, and if so, determine which areas/segments of the pixelated lighting device affect the ambiance created by the further light source and vice versa. The system may determine which areas/segments of the pixelated lighting device are the ones which are closest to the further light source, but there might be situations where the further light source only has impact or has more impact on the areas/segments of the pixelated lighting device which are not the closest ones. For example, if a light strip has segments which shine at different angles (e.g. one segment outputs a narrow beam while another segment outputs a wider beam), this could lead to a segment farther away influencing the ambiance more than the segment that is closest. The system may then adjust the original light settings to reduce a difference with the further original lighting setting.

The difference between the original light settings for the pixelated lighting device and the further light setting for the further light source may be reduced by reducing a distance between light settings (hue, saturation, brightness, or other color space coordinates) in the shared (i.e. light crosstalk) area, preferably while taking care that the user does not perceive the light effects significantly different than originally intended. This helps provide a coherent light experience using the pixelated lighting device and the further light source. Optionally, the color palette of the adjusted original light settings may be kept the same as the color palette of the original light settings. The shared area is the area in which light from the pixelated lighting device and light from the further light source are both visible, e.g. where two light beams overlaps.

Said at least one processor may be configured to obtain an image captured by a camera and determine said relative location from said image, for example. Alternatively, said at least one processor may be configured to obtain light sensor data from a light sensor embedded in or attached to said pixelated lighting device (and/or from a light sensor embedded in or attached to said further light source) and determine said relative location from said light sensor data, for example.

Said at least one processor may be configured to adjust said original light settings by assigning, in said adjusted original light settings, at least one of said original light settings to a different individually addressable light segment than an individually addressable light segment associated with said original light setting in said original light settings. For example, said at least one processor may be configured to adjust multiple of said original light settings by assigning, in said adjusted original light settings, multiple of said original light settings to a different individually addressable light segment than an individually addressable light segment associated with said original light setting in said original light settings.

This results in a shift of the original light settings such that the light effects rendered by the pixels of the pixelated lighting device mix better with the light effect rendered by the further light source. By not only merging light effects in the shared areas but by properly cascading those changes throughout the rest of the segments, a light experience may be provided that is not only coherent in the shared area but in the areas illuminated by all segments.

A similar coherent light experience may be achieved without changing the assignment of original light settings to light segments, but in this case a difference between each of said adjusted original light settings and a corresponding original light setting should preferably be limited to a predetermined maximum in order not to deviate too much from the originally intended light effects/ambiance.

Said at least one processor may be configured to adjust at least one of said original light settings based on a color, brightness and/or color saturation of at least one other of said original light settings. This may be used to obtain a coherent light experience which is similar to the one obtained by changing the assignment of original light settings to light segments, but without changing the assignment of original light settings to light segments.

Said at least one processor may be configured to ensure that a difference between an average color, brightness and/or color saturation of said adjusted original light settings and an average color, brightness and/or color saturation of said original light settings does not exceed a first threshold and a difference between a color, brightness and/or color saturation distribution of said adjusted original light settings and a color, brightness and/or color saturation distribution of said original light settings does not exceed a second threshold. This helps not to deviate from the originally intended light effects/ambiance too much.

Two of said individually addressable light segments may be edge segments and said original light settings associated with said edge segments may be left unadjusted. This is beneficial, for example, if the two edge segments are connected, e.g. if the pixelated lighting device is a light strip along a circular path, and this may also help not to deviate from the originally intended light effects/ambiance too much.

Said at least one processor may be configured to adjust said further original light setting based on said original light settings and said relative location of said further light source and control, via said at least one control interface, said further light source to emit further light according to said adjusted further original light setting. This allows the adjustments to the original light settings to be smaller and thereby reduces deviations from the originally intended light effects/ambiance.

Said at least one processor may be configured to control said individually addressable light segments to start emitting said light and stop emitting said light synchronized with said further light source starting to emit and stopping to emit further light according to said further original light setting. This may be used to prevent that adjustment of the original light settings affect the originally intended dynamicity of the light effects too much.

Said at least one processor may be configured to select one or more of said plurality of individually addressable light segments based on said relative location of said further light source, said selected one or more individually addressable light segment being estimated to illuminate a same spatial area as said further light source, and adjust said original light settings based on said further original light setting and said selection. For example, the original light settings of the selected segments may be adjusted to be more similar to the further original light setting of the further light source and the original light settings of the other segments may be adjusted or kept the same such that the deviation from the originally intended light effects/ambiance is limited.

In a second aspect of the invention, a method of controlling a pixelated lighting device, said pixelated lighting device comprising a plurality of individually addressable light segments, comprises determining a location of a further light source relative to said pixelated lighting device, obtaining original light settings for said pixelated lighting device, said original light settings being associated with respective ones of said individually addressable light segments, obtaining a further original light setting for said further light source, adjusting said original light settings based on said further original light setting and said relative location of said further light source, and controlling said individually addressable light segments to emit light according to said adjusted original light settings. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling a pixelated lighting device, said pixelated lighting device comprising a plurality of individually addressable light segments.

The executable operations comprise determining a location of a further light source relative to said pixelated lighting device, obtaining original light settings for said pixelated lighting device, said original light settings being associated with respective ones of said individually addressable light segments, obtaining a further original light setting for said further light source, adjusting said original light settings based on said further original light setting and said relative location of said further light source, and controlling said individually addressable light segments to emit light according to said adjusted original light settings.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
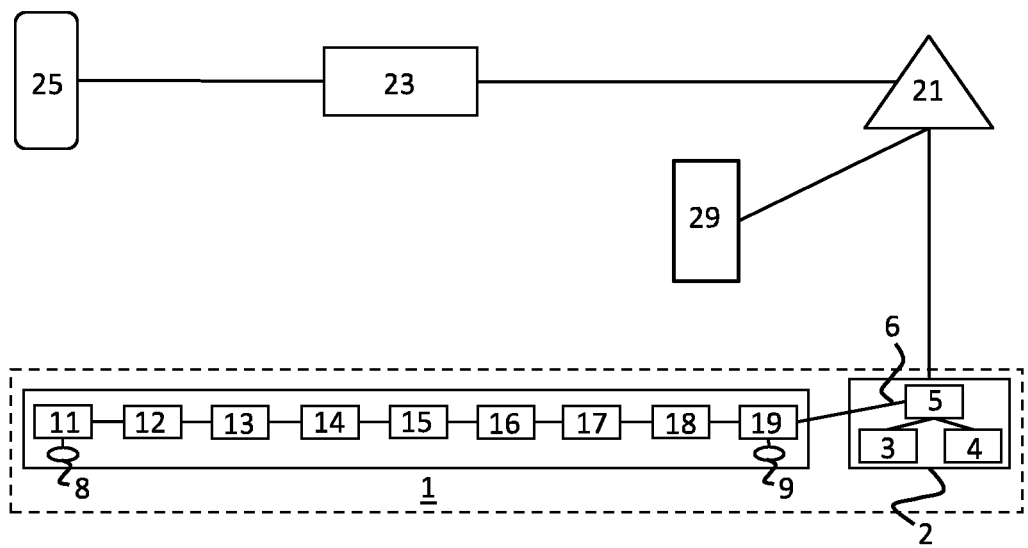
FIG. 1 is a block diagram of a first embodiment of the system.

FIG. 1 shows a first embodiment of the system for controlling a pixelated lighting device. In the example of FIG. 1, the pixelated lighting device is a light strip 1. In the embodiment of FIG. 1, the system is a controller 2 of the light strip 1. The light strip 1 comprises nine individually addressable light segments 11-19. In the embodiment of FIG. 1, each segment comprises a single light element, e.g. a direct emitting or phosphor converted LED. In an alternative embodiment, one or more of the segments comprise multiple light elements. Nine light elements per light strip will in practice be a relatively low quantity of light elements per light strip, but this quantity has been chosen for the purpose of illustration.

In the embodiment of FIG. 1, the light strip 1 can be controlled via a bridge 21, e.g. using Zigbee technology. The bridge 21 is connected to a wireless LAN access point 23, e.g. via Ethernet or Wi-Fi. A mobile device 25 is also connected to the wireless LAN access point 23, e.g. via Wi-Fi. Mobile device 25 may be a mobile phone, a tablet or a smart watch, for example. A user may be able to use an app running on mobile device 25 to control light strip 1 via the wireless LAN access point 23 and the bridge 21. In an alternative embodiment, the light strip 1 is controlled without a bridge, e.g. directly via Bluetooth or WiFi.

The controller 2 of the light strip 1 comprises a receiver 3, a transmitter 4, a processor 5, and a control interface 6. The processor 5 is configured to determine a location of a further light source 29 relative to the light strip 1 and obtain original light settings for the light strip 1. The original light settings are associated with respective ones of the individually addressable light segments 11-19.

The processor 5 is further configured to obtain a further original light setting for the further light source 29, adjust the original light settings based on the further original light setting and the relative location of the further light source 29, and control, via the control interface 6, the individually addressable light segments 11-19 to emit light according to the adjusted original light settings.

The controller 2 may receive the original light settings for light strip 1 and the further original light for further light source 29 from the bridge 21, for example. The bridge 21 may receive these light settings from the mobile device 25, for example. Alternatively, the mobile device 25 may transmit a light scene identifier to bridge 21 and bridge 21 may look up the light settings associated with this light scene identifier.

The light strip 1 may transmit information identifying how many segments it has or may transmit information identifying its type, which allows the mobile device 25 or the bridge 21 to determine the quantity of segments, e.g. with the help of an Internet database. After the mobile device 25 has learned the quantity of segments supported by the light strip 1, it is able to create light effects optimized for the light strip 1.

In the embodiment of FIG. 1, the light strip 1 comprises light sensors 8 and 9 and the processor 5 is configured to obtain light sensor data from the light sensors 8 and 9 and determine the relative location from the light sensor data. For example, the processor 5 may be configured to determine a light output of the further light source 29 in lumen based on the brightness value/light output level specified in the further original light setting and based on the type of the further light source 29. The processor 5 may be configured to compare this light output with the light levels measured by the light sensors 8 and 9, e.g. in lux, to determine the distances between each of the light sensors 8 and 9 and the further light source 29.

The position of the further light source 29 relative to the light strip 1 may be calculated from these two distances. The processor 5 may be configured to determine a light crosstalk area based on the type of the light strip 1, the type of the further light source 29 and the relative position. The processor 5 may be configured to determine which of the light segments 11-19 cause and experience this light crosstalk and adjust the original light settings such that the light effects rendered by the light segments that cause and experience light crosstalk are more similar to the light effect rendered by the further light source 29, which also causes and experiences this light crosstalk. In an alternative embodiment, the light sensors 8 and 9 are attached to the light strip 1 instead of embedded in the light strip 1.

The further light source 29 may comprise one or more pixels. The further light source 29 may be an up and downlighter, for example. Both up and downlight may render the same light effect. In this case, one further original light setting is enough. Alternatively, the up and downlight may render different light effects. In this case, the processor 5 may be configured to receive two further original light settings for the further light source 29 but may only need to use one of the two further original light settings.

Instead of a lighting device, the further light source 29 may be a device which is not part of the lighting system, but which does influence the ambiance, e.g. a display device displaying uniformly colored images. For example, if there is a PC screen near the end of the pixelated light strip 1, the controller 2 might choose to adjust the original light settings for the light strip 1 such that on the end of the light strip 1 always the most similar color to the screen saver of the PC is shown. This is beneficial if the screen saver displays images of a large uniformly colored (e.g. green) surface.

In the embodiment of the controller 2 shown in FIG. 1, the controller 2 comprises one processor 5. In an alternative embodiment, the controller 2 comprises multiple processors. The processor 5 of the controller 2 may be a general-purpose processor or an application-specific processor. The receiver 3 and the transmitter 4 may use one or more wireless communication technologies. e.g. Zigbee, for communicating with the bridge 21. In an alternative embodiment, multiple receivers and/or multiple transmitters are used instead of a single receiver and a single transmitter.

In the embodiment shown in FIG. 1, a separate receiver and a separate transmitter are used. In an alternative embodiment, the receiver 3 and the transmitter 4 are combined into a transceiver. The controller 2 may comprise other components typical for a light strip controller such as a power converter and a power connector for connecting the power converter to mains powers. The invention may be implemented using a computer program running on one or more processors.

In the embodiment of FIG. 1, the system is a controller of a light strip. In an alternative embodiment, the system is a different device, e.g. the light strip itself, a mobile device, or a bridge which can control such a light strip. In the embodiment of FIG. 1, the system comprises a single device. In an alternative embodiment, the system comprises a plurality of devices.

In the example of FIG. 1, the light strip 1 causes light crosstalk to one device and experiences light crosstalk from this one device. Alternatively, the light strip 1 may cause light crosstalk to multiple devices and experience light crosstalk from these multiple devices.

Figure 2:
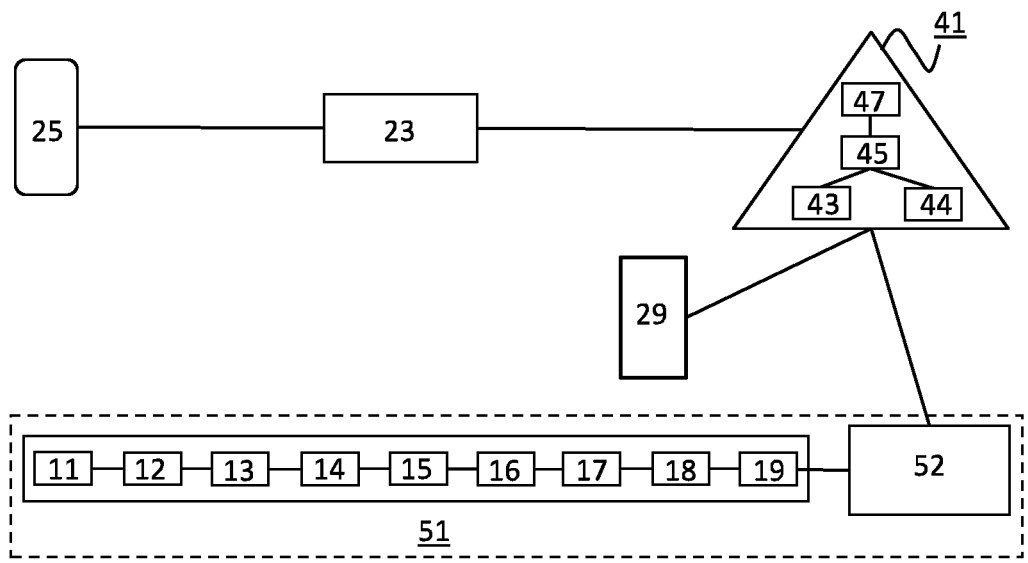
FIG. 2 is a block diagram of a second embodiment of the system.

FIG. 2 shows a second embodiment of the system for controlling a pixelated lighting device: a bridge 41. The bridge 41 controls a light strip 51, e.g. using Zigbee technology. The light strip 51 comprises a controller 52 and individually addressable light segments 11-19. In the example of FIG. 2, each segment comprises a single light element, e.g. a direct emitting or phosphor converted LED. Alternatively, one or more of the segments may comprise multiple light elements.

The bridge 41 may be a Philips Hue bridge, for example. The bridge 41 is connected to the wireless LAN access point 23, e.g. via Ethernet or Wi-Fi. As described in relation to FIG. 1, the mobile device 25 is also connected to the wireless LAN access point 23, e.g. via Wi-Fi. The bridge 41 may include the functionality of an HDMI module like the Hue Play HDMI Sync Box. An HDMI module analyzes audio and/or video of an incoming HDMI signal, determines light effects based on this analysis and controls one or more lighting devices to render the determined light effects, e.g. via Zigbee and/or Bluetooth.

The bridge 41 comprises a receiver 43, a transmitter 44, a processor 45, and memory 47. The processor 45 is configured to determine a location of further light source 29 relative to the light strip 51 and obtain original light settings for the light strip 51. The original light settings are associated with respective ones of the individually addressable light segments 11-19. The processor 45 may be configured to obtain an image captured by a camera, e.g. embedded in the mobile device 25, and determine the relative location from the image.

The processor 45 is further configured to obtain a further original light setting for the further light source 29, adjust the original light settings based on the further original light setting and the relative location of the further light source 29, and control, via the transmitter 45, the individually addressable light segments 11-19 to emit light according to the adjusted original light settings.

The processor 45 may receive the original light settings for light strip 1 and the further original light setting for further light source 29 from the mobile device 25, for example. Alternatively, the mobile device 25 may transmit a light scene identifier to bridge 41 and bridge 41 may look up the light settings associated with this light scene identifier, e.g. in memory 47.

A user might be able to provide via an app running on mobile device 25 the locations of the lighting devices (or other light sources), such that the bridge 41 can determine which (segments of) pixels of the involved devices seem to be the closest. For example, the user may be able to enter the locations manually or have the app analyze an image captured by a camera of mobile device 25. Once this information is known, the bridge 41 may determine which is the critical parameter to be optimized to create a coherent light experience.

If the original light settings of the light strip 1 and the further light source 29 are similar but different, the bridge 41 may conclude that there is a need to merge settings due to the similarity of settings (e.g. both devices set to warm/relaxing colors), but it is also important to align the distribution of such colors throughout the light strip with the light area influenced by the further light source 29 (this light area will also be referred to as light crosstalk area and shared area). For this, the bridge 41 might choose to shift the location of the color setting that is most similar to the color setting for the further light source 29 such that the difference in gradients from both devices in the shared area is minimized.

If the original light settings of the light strip 1 and the further light source 29 are too different from each other (e.g. the light strip 1 is placed in in a cove, the further light source 29 is a wall light, the light strip 1 is set to fixed white throughout, and the wall light is set to red both up and down), the bridge 41 may conclude that the user is most likely intentionally setting those specific colors and that there is therefore no need to adjust any light settings.

In the embodiment of the bridge 41 shown in FIG. 2, the bridge 41 comprises one processor 45. In an alternative embodiment, the bridge 41 comprises multiple processors. The processor 45 of the bridge 41 may be a general-purpose processor, e.g. ARM-based, or an application-specific processor. The processor 45 of the bridge 41 may run a Unix-based operating system for example. The memory 47 may comprise one or more memory units. The memory 47 may comprise one or more hard disks and/or solid-state memory, for example.

The receiver 43 and the transmitter 44 may use one or more wired or wireless communication technologies such as Zigbee to communicate with the light strip 51 and Ethernet to communicate with the wireless LAN access point 23, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 43 and the transmitter 44 are combined into a transceiver. The bridge 41 may comprise other components typical for a bridge such as a power connector. The invention may be implemented using a computer program running on one or more processors.

Figure 3:
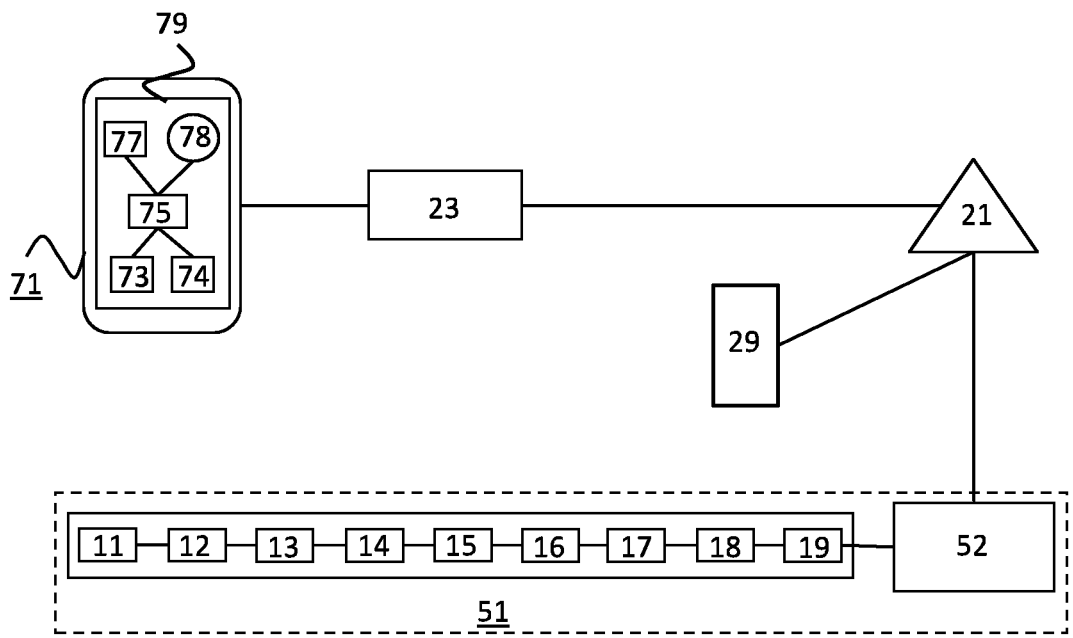
FIG. 3 is a block diagram of a third embodiment of the system.

FIG. 3 shows a third embodiment of the system for controlling a pixelated lighting device: a mobile device 71. The mobile device 71 may be a mobile phone or a tablet, for example. A user may be able to use an app running on mobile device 71 to control light strip 51 via the wireless LAN access point 23 and the bridge 21. The bridge 21 has been described in relation to FIG. 1. In the embodiment of FIG. 3, the light strip 51 is controlled via the bridge 21. In an alternative embodiment, the light strip 51 is controlled without a bridge, e.g. directly via Bluetooth.

The mobile device 71 comprises a receiver 73, a transmitter 74, a processor 75, a memory 77, a camera 78, and a display 79. The processor 75 is configured to determine a location of further light source 29 relative to the light strip 51 and obtain original light settings for the light strip 51. The original light settings are associated with respective ones of the individually addressable light segments 11-19. The processor 75 may be configured to obtain an image captured by camera 78 and determine the relative location from the image.

The processor 75 is further configured to obtain a further original light setting for the further light source 29, adjust the original light settings based on the further original light setting and the relative location of the further light source 29, and control, via the transmitter 74, the individually addressable light segments 11-19 to emit light according to the adjusted original light settings.

The processor 75 may obtain the original the original light settings for light strip 1 and the further original light for further light source 29 from a light scene or a light script, for example. A light script specifies a time-based rendering of light settings. One or more light scenes and/or one or more light scripts may be stored in memory 77 and/or may be stored on an Internet server, for example.

In the embodiment of the mobile device 71 shown in FIG. 3, the mobile device 71 comprises one processor 75. In an alternative embodiment, the mobile device 71 comprises multiple processors. The processor 75 of the mobile device 71 may be a general-purpose processor, e.g. from ARM or Qualcomm or an application-specific processor. The processor 75 of the mobile device 71 may run an Android or iOS operating system for example. The display 79 may comprise an LCD or OLED display panel, for example. The display 79 may be a touch screen display, for example. The memory 77 may comprise one or more memory units. The memory 77 may comprise solid state memory, for example.

The receiver 73 and the transmitter 74 may use one or more wireless communication technologies such as Wi-Fi (IEEE 802.11) to communicate with the wireless LAN access point 23, for example. In an alternative embodiment, multiple receivers and/or multiple transmitters are used instead of a single receiver and a single transmitter. In the embodiment shown in FIG. 3, a separate receiver and a separate transmitter are used. In an alternative embodiment, the receiver 73 and the transmitter 74 are combined into a transceiver. The camera 78 may comprise a CMOS or CCD sensor, for example. The mobile device 71 may comprise other components typical for a mobile device such as a battery and a power connector. The invention may be implemented using a computer program running on one or more processors.

Figure 4:
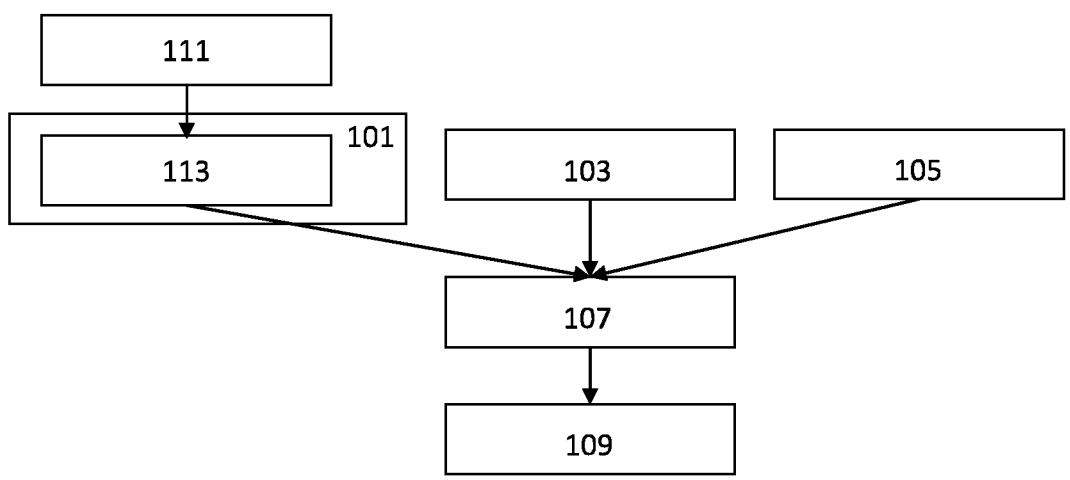
FIG. 4 is a flow diagram of a first embodiment of the method.

A first embodiment of the method of controlling a pixelated lighting device is shown in FIG. 4. The pixelated lighting device comprises a plurality of individually addressable light segments. A step 101 comprises determining a location of a further light source relative to the pixelated lighting device. A step 103 comprises obtaining original light settings for the pixelated lighting device. The original light settings are associated with respective ones of the individually addressable light segments.

A step 105 comprises obtaining a further original light setting for the further light source. A step 107 comprises adjusting the original light settings based on the further original light setting and the relative location of the further light source. For example, step 107 may comprise determining which of the light segments, when turned on, would emit light that overlaps with light emitted by the further light source (and therefore creates light crosstalk), when the further light source is turned on. This may be realized by using a known physical model of light propagation, for example. Step 107 may then further comprise adjusting the original light settings of those light segments to be more similar, while ensuring that a difference between each of the adjusted original light settings and a corresponding original light setting is limited to a predetermined maximum.

A step 109 comprises controlling the individually addressable light segments to emit light according to the adjusted original light settings. In the embodiment of FIG. 1, step 101 is preceded by a step 111 and step 101 is implemented by a step 113. Step 111 comprises obtaining an image captured by a camera. Step 113 comprises determining the relative location from the image.

Figure 5:
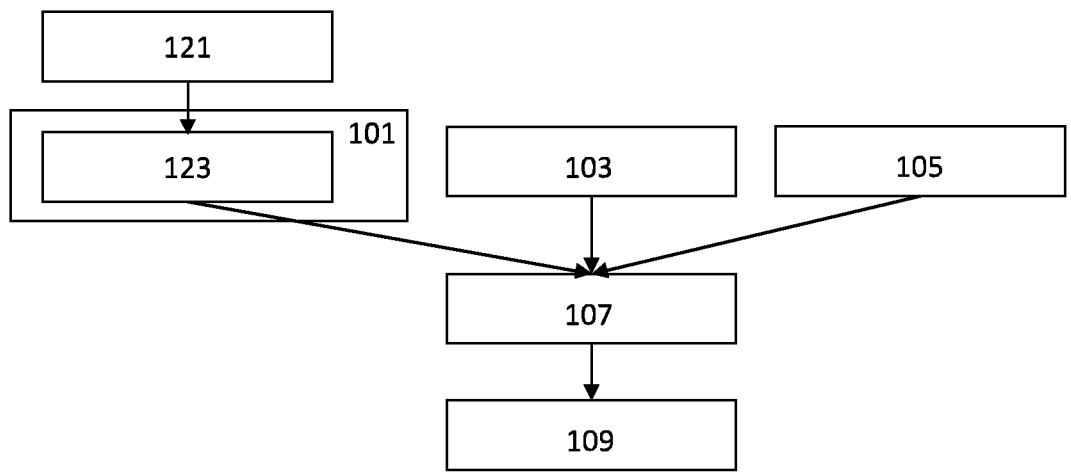
FIG. 5 is a flow diagram of a second embodiment of the method.

A second embodiment of the method of controlling a pixelated lighting device is shown in FIG. 5. In the embodiment of FIG. 5, step 111 of FIG. 4 has been replaced by a step 121 and step 101 of FIG. 4 is implemented by a step 123 instead of by step 113. Step 121 comprises obtaining light sensor data from a light sensor embedded in or attached to the pixelated lighting device. Step 123 comprises determining the relative location from the light sensor data. The light sensor data may be obtained from a single light sensor or from multiple light sensors.

The light sensor data is preferably obtained from at least two light sensors and compared with the light output level(s) (e.g. in lumen) of the further light source(s) in the vicinity, but it is also possible to determine the relative location without knowing the light output levels of these further light sources. The light sensor may also be obtained from a single light sensor by comparing the light sensor data with the light output level(s) of at least the further light source(s) in the vicinity. It may then be necessary to incorporate, into the pixelated lighting device, an orientation sensor for determining how the pixelated lighting device has been placed, e.g. which side is facing up and which side is facing down. This should normally make it possible to determine which of the light segments of the pixelated lighting device are farther away from the further light source than the light sensor and which light segments are closer to the further light source than the light sensor.

Figure 6:
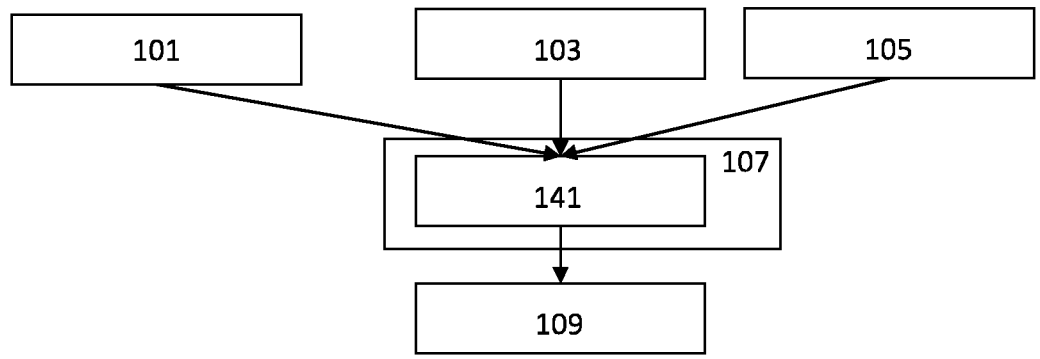
FIG. 6 is a flow diagram of a third embodiment of the method.

A third embodiment of the method of controlling a pixelated lighting device is shown in FIG. 6. In the embodiment of FIG. 6, steps 111 and 113 of FIG. 4 have been omitted and step 107 of FIG. 4 is implemented by a step 141. Step 141 comprises assigning, in the adjusted original light settings, at least one of, and possibly multiple of, the original light settings to a different individually addressable light segment than an individually addressable light segment associated with the original light setting in the original light settings.

Figure 7:
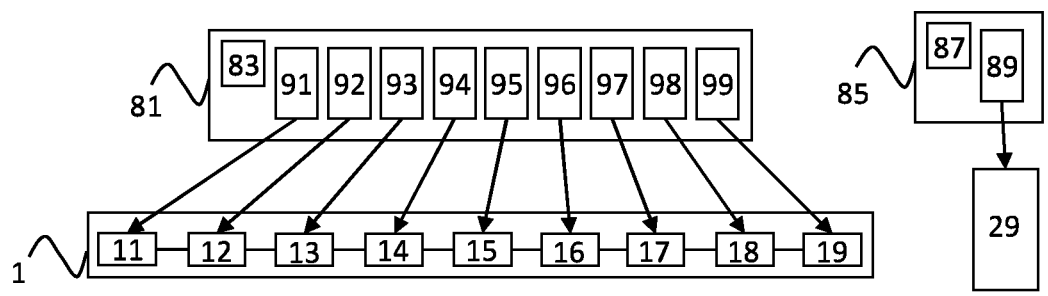
FIG. 7 illustrates a conventional method of assigning light settings to light segments.

FIG. 7 illustrates a conventional method of assigning light settings to light segments. FIG. 7 shows a data structure 81 comprising an identifier 83 and nine light settings 91-99 and a data structure 85 comprising an identifier 87 and one light setting 89. The data structures 81 and 85 may be light commands, for example. In this case, the identifiers 83 and 87 may comprise device identifiers of the pixelated lighting device 1 and the further light source 29, respectively.

Alternatively, the data structures 81 and 85 may be light scenes, for example. In this case, the identifiers 83 and 87 may comprise scene identifiers. Alternatively, the data structures 81 and 85 may be part of a light script, for example. The light settings 91-99 are stored in sequence in the data structure 81 and are assigned to the respective individually addressable light segments 11-19 of pixelated lighting device 1. The light setting 89 is assigned to the further light source 29.

Figure 8:
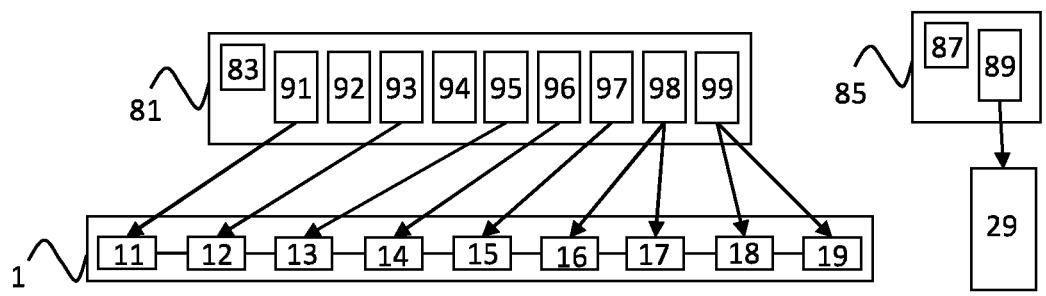
FIG. 8 shows an example of original light settings being adjusted according to the method of FIG. 6.

FIG. 8 shows an example of original light settings being adjusted according to the method of FIG. 6. In this example, multiple of the original light settings are assigned to a different light segment than originally intended. Original light settings 91 and 99 are assigned to light segments 11 and 19, as intended. To the other light segments, different light settings than originally intended are assigned, thereby resulting in adjusted original light settings.

Original light setting 93 is assigned to light segment 12, original light settings 95-97 are assigned to light segments 13-16, respectively, original light setting 98 is assigned to light segments 16 and 17, and original light setting 99 is additionally assigned to light segment 19. Original light settings 92 and 94 are not assigned to any of the light segments. In this example, the original light settings are merely assigned to different light segments and the adjusted original light settings and the original light settings therefore use the same color palette.

Figure 10:
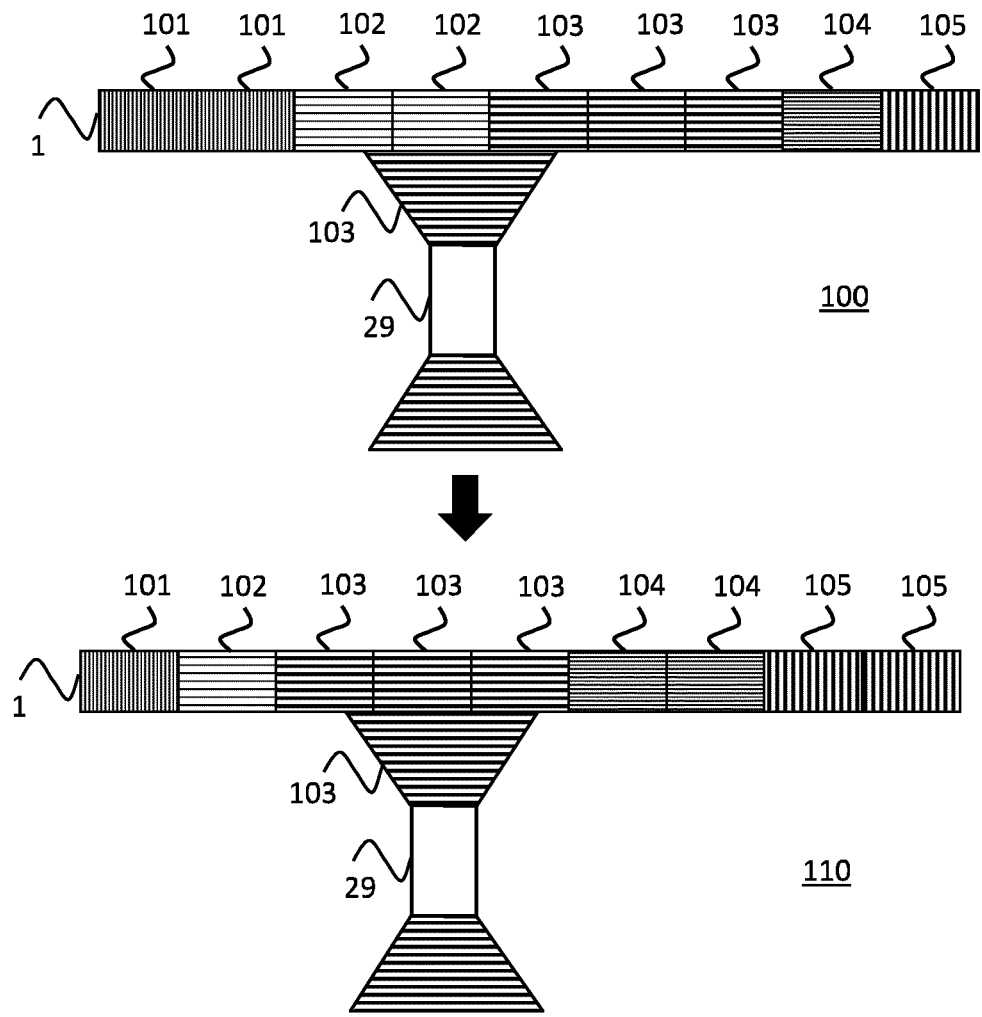
FIG. 10 shows the rendering of the adjusted original light effects of the example of FIG. 8.

The assignment is made in the way described in the previous two paragraphs, because the light emitted by light segments 13 to 15 and the light emitted by further light source 29 overlaps and light settings 95 to 97 are the same as light setting 90 of the further light source 29, i.e. render the same light effect. The original light settings are therefore adjusted by shifting them to the left. FIG. 10 shows the rendered light settings of the example of FIG. 8.

Instead of creating the conventional light experience 100, an improved light experience 110 is created. Light settings 91 and 92 of FIG. 8 specify the same light effect 101, light settings 93 and 94 of FIG. 8 specify the same light effect 102, light settings 95-97 and 89 of FIG. 8 specify the same light effect 103, light setting 98 of FIG. 8 specifies the light effect 104, and light setting 99 of FIG. 8 specifies the light effect 105.

The same assignment may be performed for the different components of the original light settings, e.g. for both color and brightness values. Alternatively, different assignments may be performed for different components of the original light settings, e.g. all brightness values may be assigned to the light segments as originally intended and some or all of the color values may be assigned to different light segments than originally intended.

The assignment of FIG. 8 is made such that a difference between an average color, brightness and/or color saturation of the adjusted original light settings and an average color, brightness and/or color saturation of the original light settings does not exceed a first threshold and a difference between a color, brightness and/or color saturation distribution of the adjusted original light settings and a color, brightness and/or color saturation distribution of the original light settings does not exceed a second threshold.

Figure 9:
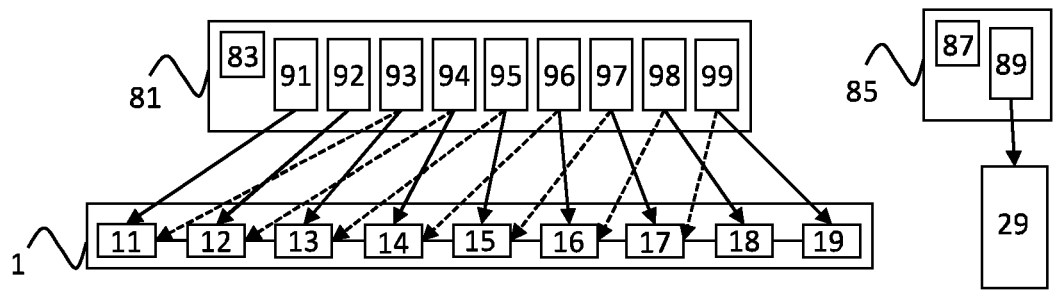
FIG. 9 shows an example of original light settings being adjusted according to a fourth embodiment of the method.

FIG. 9 shows an example of original light settings being adjusted according to a fourth embodiment of the method. In this fourth embodiment, at least one of the original light settings is adjusted based on a color, brightness and/or color saturation of at least one other of the original light settings. In the example of FIG. 9, the original light settings are first assigned to the light segments for which they were intended and then the assigned light settings for light segments 11-17 are adjusted based on at least one other of the original light settings.

The light setting for light segment 11 is an average of original light settings 91 and 93. The light setting for light segment 12 is an average of original light settings 92 and 94. The light setting for light segment 13 is an average of original light settings 93 and 95. The light setting for light segment 14 is an average of original light settings 941 and 96. The light setting for light segment 15 is an average of original light settings 95 and 97. The light setting for light segment 16 is an average of original light settings 96 and 98. The light setting for light segment 17 is an average of original light settings 97 and 99.

Similar to the example of FIG. 8, the assignment of FIG. 9 is made such that a difference between an average color, brightness and/or color saturation of the adjusted original light settings and an average color, brightness and/or color saturation of the original light settings does not exceed a first threshold and a difference between a color, brightness and/or color saturation distribution of the adjusted original light settings and a color, brightness and/or color saturation distribution of the original light settings does not exceed a second threshold.

As the number of pixelated devices in a space increases, some additional issues might arise. For example, merging colors of pixels in close proximity might lead to new colors which are not part of any of the color palettes of the light scenes/light settings rendered by those devices, or that significantly affect the perceived ambiance. For instance, if three pixelated segments from three corresponding devices have values of red, green, and blue respectively, the system might conclude that the best way to merge them is to have those pixels go to white, as it limits the overall distance in the color space from each to the resulting one. However, this might ruin the ambiance as it is not the desired color. The system might not just take minimizing the differences between proximal devices into account but might also ensure that these are part of the color palette of the light scene/light settings of at least one of the devices. The assignment of FIG. 9 is optionally made such that the adjusted original light settings and the original light settings use the same color palette.

In a fifth embodiment of the method, there is no shifting of light settings and the original light settings are not adjusted based on a color, brightness and/or color saturation of at least one other of the original light settings. Instead, the original light settings of the light segments causing light crosstalk, i.e. light segments 13-15, are adjusted based only on the further original light setting.

The other original light settings may be adjusted to ensure that that a difference between an average color, brightness and/or color saturation of the adjusted original light settings and an average color, brightness and/or color saturation of the original light settings does not exceed a first threshold and a difference between a color, brightness and/or color saturation distribution of the adjusted original light settings and a color, brightness and/or color saturation distribution of the original light settings does not exceed a second threshold.

In all these adjustments, a difference between each of the adjusted original light settings and a corresponding original light setting is limited to a predetermined maximum. Optionally, all the adjusted original light settings use the same color palette as the original light settings.

Figure 11:
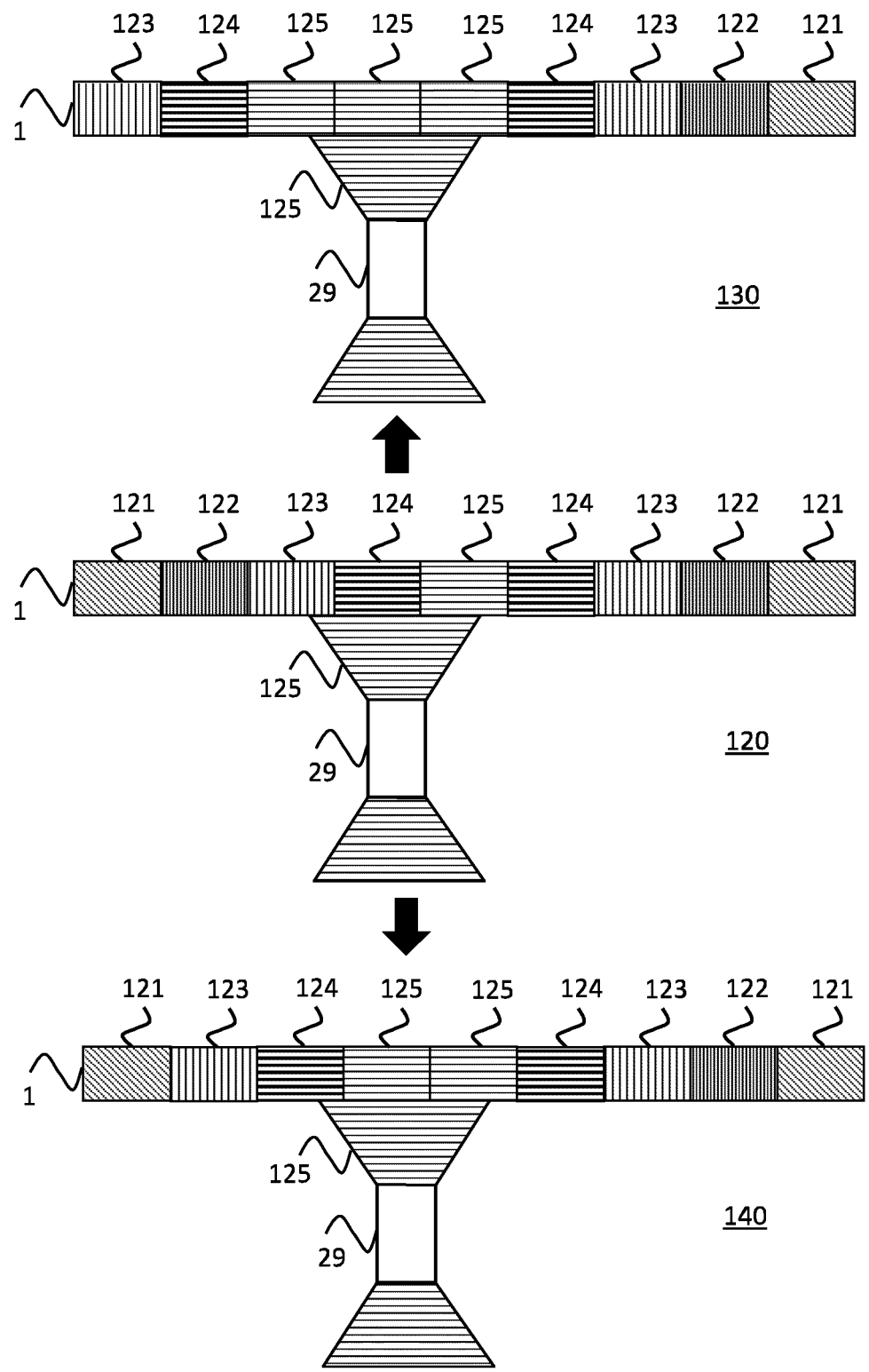
FIG. 11 shows the rendering of second and third examples of original light settings adjusted according to the method of FIG. 6.

FIG. 11 shows the rendering of second and third examples of original light settings adjusted according to the method of FIG. 6. A light experience 120 would be created when light would be emitted according the original light settings exactly as they were intended, i.e. in the conventional manner. While in the original light settings of the example of FIGS. 8 and 10, light settings specified for neighboring light segments regularly specify the same light effect, this is not the case in FIG. 11. However, if the light effects being rendered on the pixelated light device use too many pixels/ segments, shifting the place where a specific color appears might lead to colors in e.g. the ends of the strip not being rendered properly, not being smoothened properly with respect to the neighboring ones, or not even fitting (if there are not enough pixels left).

When shifting the original light settings depicted in FIG. 11, removing certain light settings means reducing the number of transitions between neighboring light effects. FIG. 11 provides two examples in which the number of transitions between neighboring light effects has been reduced. In light experience 130, it is not important that the ends of the pixelated lighting device render the originally intended light settings. In light experience 130, light effect 125 is rendered on three light segments instead of one to render a light effect similar to the light effect rendered on the light source 29 in as much of the light crosstalk area as possible. The light settings for the light segments to the left of the light crosstalk area are shifted to the left. In light experience 130, light effects 121 and 122 are omitted to ensure that the transitions between light effects stay similar as originally intended.

In light experience 140, it is important that the ends/edges of the pixelated lighting device render the originally intended light settings, e.g. because the pixelated lighting device is a light strip whose ends are connected and render the same or a similar light effect. In light experience 140, the light effect 125 is rendered on two light segments, which is more than in light experience 120, but less than in light experience 130. The light effect 125 is rendered on only two light segments to ensure that the ends of the pixelated lighting device render the originally intended light settings while limiting the impact on the transitions between light effects. The original light settings associated with the edge segments are not adjusted.

Like in light experience 130, the light settings for the light segments to the left of the light crosstalk area are shifted to the left, but only light effect 122 has been omitted at the cost of less similarity in the light crosstalk area. Thus, the system might choose to still minimize the differences in gradient in the light crosstalk area but might fail to reduce it completely due to additional effects needed somewhere in the strip.

Figure 12:
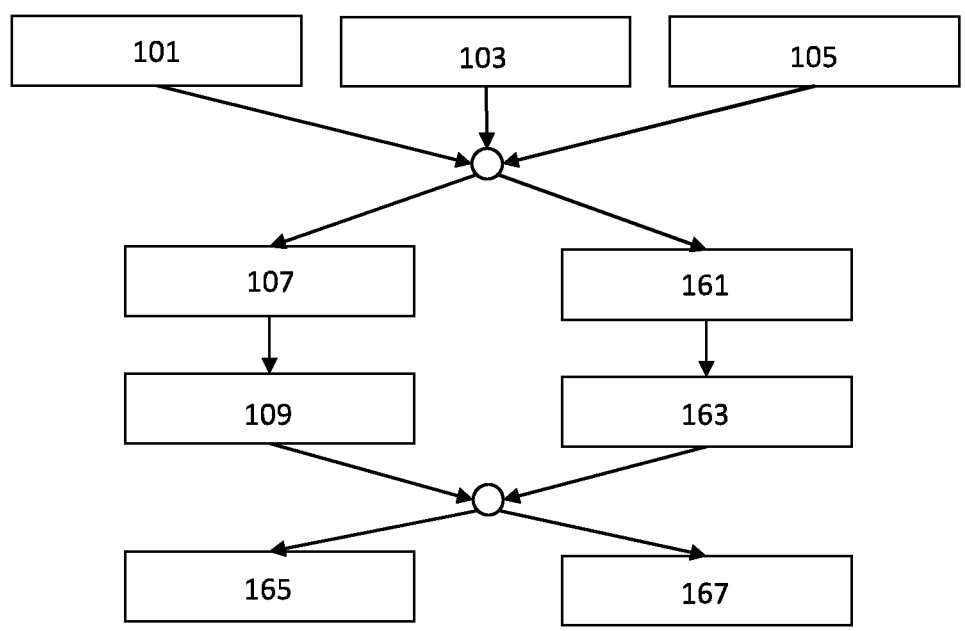
FIG. 12 is a flow diagram of a sixth embodiment of the method.

A sixth embodiment of the method of controlling a pixelated lighting device is shown in FIG. 12. In this sixth embodiment, not only step 107 is performed after steps 101, 103, and 105, but also a step 161. Step 161 comprises adjusting the further original light setting based on the original light settings and based on the relative location of the further light source, i.e. in dependence on whether the further light source causes light crosstalk. Next, a step 163 comprises controlling the further light source to emit further light according to the adjusted further original light setting.

In the embodiment of FIG. 12, step 109 comprises controlling the individually addressable light segments to start emitting the light and step 163 comprises controlling the further light source to start emitting the further light. Later, steps 165 and 167 are performed. Step 165 comprises controlling the individually addressable light segments to stop emitting the light and step 167 comprises controlling the further light source to stop emitting the further light.

In an alternative embodiment, steps 163 and 167 are omitted and instead, steps of detecting that said further light source is starting, is about to start, or has started to emit the further light and detecting that said further light source is stopping, is about to stop, or has stopped to emit the further light are performed. Steps 109 and 165 are performed upon detecting these starting and stopping events, respectively.

When dynamic light effects (i.e. light settings change over time) are rendered on the lighting devices, this might introduce an additional cause for ambiance to be disrupted, as these changes might not be synchronized spatially and temporally. For example, if brightness changes over time and over pixels, across multiple lights, it might happen that when the further light source is at its lowest brightness, the segment overlapping with it in the light strip might be at its highest, and vice versa, meaning that the resulting brightness seems homogeneous throughout the area. This might be counterproductive if the goal of the room's effects was to show shifting brightness spots (for example to mimic clouds moving in the sky). By synchronizing the effects, e.g. the start and stop of the transitions, a desired light effect may be shown synchronously shown in the light crosstalk area. In this case, how the light effects cascade towards the other segments of the pixelated devices may be deprioritized.

Figure 13:
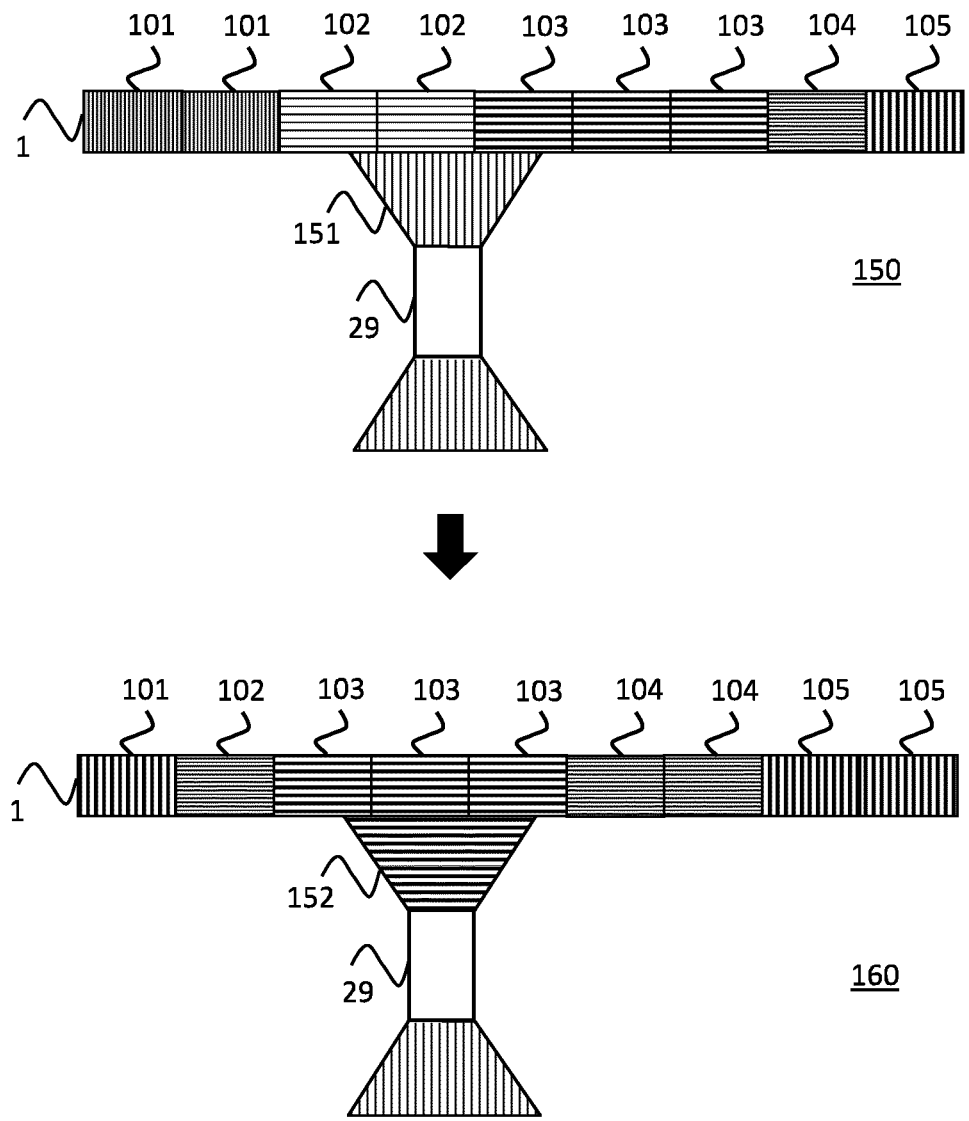
FIG. 13 shows the rendering of an example of original light settings adjusted according to the method of FIG. 12.

FIG. 13 shows the rendering of an example of original light settings adjusted according to the method of FIG. 12. A light experience 150 would be created when light would be emitted according to the original light settings exactly as they were intended, i.e. in the conventional manner. In the example of FIG. 13, the original light settings for the pixelated lighting device are the same as in the example of FIG. 10. However, the further original light setting for the further light source 29 is different in the example of FIG. 13 than in the example of FIG. 10. In the example of FIG. 13, the further light source 29 renders light effect 151 instead of light effect 103.

Since the light effect 103 is most similar to the light effect 151, some of the light settings are shifted to the left such that the light effect 103 is rendered in the light crosstalk area, as described in relation to FIGS. 8 and 10. Additionally, since the further light source creates light crosstalk, the further original light setting is also adjusted based on the original light settings. In the example of FIG. 13, the further original light setting is adjusted to a light setting for rendering light effect 152, which is more similar to light effect 103 than light effect 151.

For example, a downlight might take up a more orange color such that an uplight can change to something that the light strip can also use, without significantly changing the overall ambiance. In this case, the system chooses to minimize the differences in hue and saturation in the shared space by modifying the colors displayed in that area rather than just porting it to another set of pixels. Therewith, a light experience 160 is created.

Figure 14:
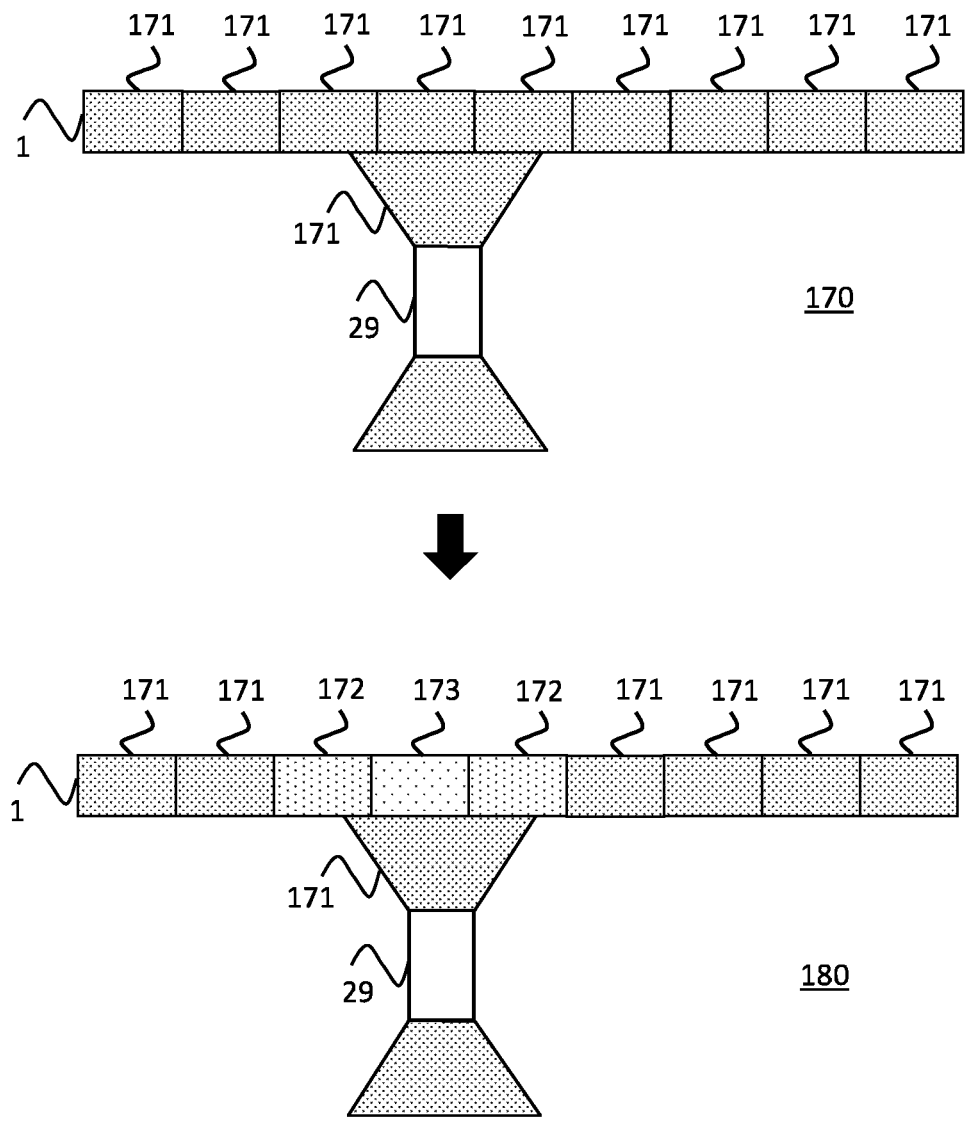
FIG. 14 shows the rendering of an example of original light settings adjusted according to a seventh embodiment of the method.

FIG. 14 shows the rendering of an example of original light settings adjusted according to a seventh embodiment of the method. In the example of FIG. 14, only the brightness values of the original light settings are adjusted, or the brightness values of the original light settings are adjusted in a different manner than the color values of the original light settings. A light experience 170 would be created when light would be emitted according the original light settings exactly as they were intended, i.e. in the conventional manner.

In the example of FIG. 14, all light effects rendered by the light segments and the further light source have the same brightness 171. This causes the brightness in the light crosstalk area to be higher than in the areas where there is no light crosstalk, i.e. towards the edges, even if the colors displayed are the same. To compensate this and obtain a more even distribution across the light segments, the original light settings for three of the light segments of the pixelated lighting device are adjusted.

In the example of FIG. 14, the brightness of the light segments that experience light crosstalk is reduced. Alternatively, the brightness of the light segments that do not experience light crosstalk may be increased. Both result in the light emitted by the light segments looking more uniform in brightness. In the example of FIG. 14, the light segment that experiences most light crosstalk is reduced the most, to brightness 173, and the light segments that experience less light crosstalk are reduced somewhat less, to brightness 172.

The embodiments of FIGS. 4 to 7 and FIG. 12 differ from each other in multiple aspects, i.e. multiple steps have been added or replaced. In variations on these embodiments, only a subset of these steps is added or replaced and/or one or more steps is omitted. For example, in the embodiment of FIG. 4 and/or in the embodiment of FIG. 5, step 107 may be implemented by step 141 of FIG. 6 and/or steps 161 and 163 of FIG. 12 may be added to one or more of the embodiments of FIGS. 4 to 6.

Figure 15:
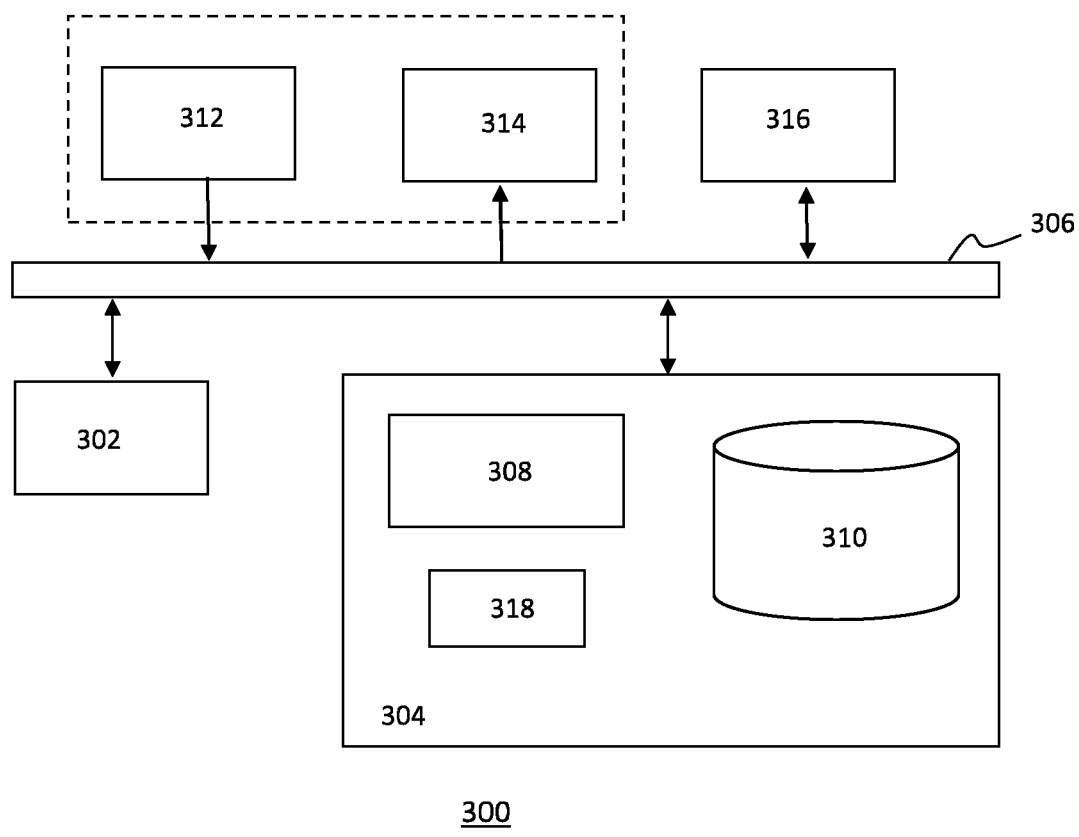
FIG. 15 is a block diagram of an exemplary data processing system for performing the method of the invention.

FIG. 15 depicts a block diagram illustrating an exemplary data processing system that may perform the method as described with reference to FIGS. 4 to 7 and FIG. 12.

As shown in FIG. 15, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 15 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 15, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 15) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 15 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling a pixelated lighting device, said pixelated lighting device having a plurality of individually addressable light segments, said system comprising:
   at least one control interface; and
   at least one processor configured to:
      determine a location of a further light source relative to said pixelated lighting device,
      obtain original light settings for said pixelated lighting device, said original light settings being associated with respective ones of said individually addressable light segments,
      obtain a further original light setting for said further light source,
      adjust said original light settings based on said further original light setting and said relative location of said further light source,
      control, via said at least one control interface, said individually addressable light segments to emit light according to said adjusted original light settings,
      adjust said original light settings by assigning, in said adjusted original light settings, at least one of said original light settings to a different individually addressable light segment than an individually addressable light segment associated with said original light setting in said original light settings, and
      prevent (i) a difference between an average color and/or color saturation of said adjusted original light settings and an average color and/or color saturation of said original light settings from exceeding a first threshold and (ii) a difference between a color and/or color saturation distribution of said adjusted original light settings and a color and/or color saturation distribution of said original light settings from exceeding a second threshold.

2. The system as claimed in claim 1, wherein said at least one processor is configured to obtain an image captured by a camera and determine said relative location from said image.

3. The system as claimed in claim 1, wherein said at least one processor is configured to obtain light sensor data from a light sensor embedded in or attached to said pixelated lighting device and determine said relative location from said light sensor data.

4. The system as claimed in claim 1, wherein a difference between each of said adjusted original light settings and a corresponding original light setting is limited to a predetermined maximum.

5. The system as claimed in claim 1, wherein said at least one processor is configured to adjust multiple of said original light settings by assigning, in said adjusted original light settings, multiple of said original light settings to a different individually addressable light segment than an individually addressable light segment associated with said original light setting in said original light settings.

6. The system as claimed in claim 1, wherein said at least one processor is configured to adjust at least one of said original light settings based on a color, brightness and/or color saturation of at least one other of said original light settings.

7. The system as claimed in claim 1, wherein two of said individually addressable light segments are edge segments and said original light settings associated with said edge segments are not adjusted.

8. The system as claimed in claim 1, wherein said at least one processor is configured to:
   adjust said further original light setting based on said original light settings and said relative location of said further light source, and
   control, via said at least one control interface, said further light source to emit further light according to said adjusted further original light setting.

9. The system as claimed in claim 1, wherein said at least one processor is configured to control said individually addressable light segments to start emitting said light and stop emitting said light synchronized with said further light source starting to emit and stopping to emit further light according to said further original light setting.

10. The system as claimed in claim 1, wherein said adjusted original light settings and said original light settings use the same color palette.

11. The system as claimed in claim 1, wherein said at least one processor is configured to:
- select one or more of said plurality of individually addressable light segments based on said relative location of said further light source, said selected one or more individually addressable light segment being estimated to illuminate a same spatial area as said further light source, and
- adjust said original light settings based on said further original light setting and said selection.

12. A method of controlling a pixelated lighting device, said pixelated lighting device having a plurality of individually addressable light segments, said method comprising:
- determining a location of a further light source relative to said pixelated lighting device;
- obtaining original light settings for said pixelated lighting device, said original light settings being associated with respective ones of said individually addressable light segments;
- obtaining a further original light setting for said further light source;
- adjusting said original light settings based on said further original light setting and said relative location of said further light source;
- controlling said individually addressable light segments to emit light according to said adjusted original light settings; and
- preventing (i) a difference between an average color, brightness and/or color saturation of said adjusted original light settings and an average color, brightness and/or color saturation of said original light settings from exceeding a first threshold and (ii) a difference between a color, brightness and/or color saturation distribution of said adjusted original light settings and a color, brightness and/or color saturation distribution of said original light settings from exceeding a second threshold
- wherein said adjusting comprises assigning, in said adjusted original light settings, at least one of said original light settings to a different individually addressable light segment than an individually addressable light segment associated with said original light setting in said original light settings.

13. A non-transitory computer-readable medium containing programming instructions being configured for performing the method of claim 12 when run on a computer system.

* * * * *